United States Patent
Gunnam

(10) Patent No.: US 9,921,969 B2
(45) Date of Patent: Mar. 20, 2018

(54) GENERATION OF RANDOM ADDRESS MAPPING IN NON-VOLATILE MEMORIES USING LOCAL AND GLOBAL INTERLEAVING

(71) Applicant: HGST Netherlands B.V., Amsterdam (NL)

(72) Inventor: Kiran Kumar Gunnam, Milpitas, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 47 days.

(21) Appl. No.: 14/967,169

(22) Filed: Dec. 11, 2015

(65) Prior Publication Data
US 2017/0017578 A1  Jan. 19, 2017

Related U.S. Application Data

(60) Provisional application No. 62/192,509, filed on Jul. 14, 2015.

(51) Int. Cl.
*G06F 12/10* (2016.01)
*G06F 9/45* (2006.01)
(Continued)

(52) U.S. Cl.
CPC ...... *G06F 12/1072* (2013.01); *G06F 12/0246* (2013.01); *G06F 12/0607* (2013.01);
(Continued)

(58) Field of Classification Search
CPC ......... G06F 12/1072; G06F 2212/7211; G06F 2212/7201; G06F 12/608; G06F 12/02; G06F 212/6082
See application file for complete search history.

(56) References Cited

U.S. PATENT DOCUMENTS 5,838,893 A * 11/1998 Douceur ............ G06F 12/02
                                                  714/6.32
5,937,435 A    8/1999 Dobbek et al.
(Continued)

FOREIGN PATENT DOCUMENTS

CN        103546397 A  *  1/2014
CN        104731713 A     6/2015

OTHER PUBLICATIONS

Teshome et al., "A Tri-Pool Dynamic Wear-Leveling Algorithm for Large Scale Flash Memory Storage Systems", htttp://ieeexplore.ieee.org/xpl/login.jsp?tp=&arnumber=5772379; downloaded May 19, 2015; 2 pages.

(Continued)

*Primary Examiner* — Ann J Lo
*Assistant Examiner* — Masud Khan
(74) *Attorney, Agent, or Firm* — Loza & Loza, LLP; Gabriel Fitch

(57) ABSTRACT

Systems and methods for generating random address mapping in non-volatile memories using local and global interleaving are provided. One such method for generating a random address mapping for a non-volatile memory (NVM) involves identifying a number of bits (N) in a physical address space of the NVM, selecting G bit(s) of the N bits to be used for global interleaving, where G is less than N, determining a number of bits (N–G) to be used for local interleaving, mapping the G bit(s) using a mapping function for global interleaving, interleaving (N–G) bits using an interleaving function for local interleaving, and generating a combined mapping comprising the mapped G bit(s) and the interleaved (N–G) bits.

26 Claims, 12 Drawing Sheets

(51) Int. Cl.
  *G06F 9/52* (2006.01)
  *G06F 12/02* (2006.01)
  *G06F 12/1072* (2016.01)
  *G06F 12/06* (2006.01)

(52) U.S. Cl.
  CPC .............. *G06F 8/458* (2013.01); *G06F 9/52* (2013.01); *G06F 12/02* (2013.01); *G06F 2201/825* (2013.01); *G06F 2212/154* (2013.01); *G06F 2212/202* (2013.01); *G06F 2212/608* (2013.01); *G06F 2212/7201* (2013.01); *G06F 2212/7211* (2013.01)

(56) References Cited

U.S. PATENT DOCUMENTS

| | | |
|---|---|---|
| 6,345,001 B1 | 2/2002 | Mokhlesi |
| 6,430,672 B1 | 8/2002 | Dhong et al. |
| 6,850,443 B2 | 2/2005 | Lofgren et al. |
| 7,711,923 B2 | 5/2010 | Rogers et al. |
| 7,911,364 B1 | 3/2011 | Zhang et al. |
| 8,266,367 B2 | 9/2012 | Yu et al. |
| 8,341,332 B2 | 12/2012 | Ma et al. |
| 8,375,160 B2 | 2/2013 | Nakanishi et al. |
| 8,522,072 B2 | 8/2013 | Huang |
| 8,660,608 B2 | 2/2014 | Schell et al. |
| 8,667,248 B1 | 3/2014 | Neppalli |
| 8,719,489 B2 | 5/2014 | Tzeng |
| 8,745,357 B2 | 6/2014 | Tucek et al. |
| 8,782,320 B2 | 7/2014 | Gunnam |
| 8,806,171 B2 | 8/2014 | Seong et al. |
| 8,862,810 B2 | 10/2014 | Lee et al. |
| 8,977,894 B2 | 3/2015 | Eleftheriou et al. |
| 9,104,555 B2 | 8/2015 | Liebowitz et al. |
| 9,158,672 B1 | 10/2015 | Zheng et al. |
| 9,170,933 B2 | 10/2015 | Cideciyan et al. |
| 9,189,420 B2 | 11/2015 | Yu et al. |
| 9,268,686 B2 | 2/2016 | Linkewitsch |
| 2005/0258863 A1 | 11/2005 | Chang et al. |
| 2006/0282610 A1 | 12/2006 | Dariel et al. |
| 2010/0070735 A1* | 3/2010 | Chen ............... G06F 12/0246 711/206 |
| 2010/0088461 A1 | 4/2010 | Yang et al. |
| 2010/0115175 A9 | 5/2010 | Zhuang et al. |
| 2010/0125696 A1 | 5/2010 | Kumar et al. |
| 2012/0099670 A1* | 4/2012 | Gunnam ............... H04L 1/0052 375/295 |
| 2013/0166827 A1 | 6/2013 | Cideciyan et al. |
| 2014/0052899 A1 | 2/2014 | Nan |
| 2014/0189284 A1 | 7/2014 | Hyuseinova et al. |
| 2014/0237160 A1 | 8/2014 | Dong |
| 2014/0337564 A1 | 11/2014 | Varanasi |
| 2015/0012694 A1 | 1/2015 | Edelhaeuser |
| 2015/0134930 A1 | 5/2015 | Huang et al. |

OTHER PUBLICATIONS

Chen et al, "Energy and Memory Efficient Mapping of Bitonic Sorting on FPGA"; FPGA '15 Proceedings of the 2015 AC/SIGDA Intl Symposium on Field-Programmable Gate Arrays; 2015; pp. 240-259; ISBN 978-1-4503-3315-3; doi 10.1145/2684746.2689068; http://dl.acm.org/citation.cfm?id=2689068.

HGST, Inc. "FlashMAX PCIe" Data Sheet; https://www.hgst.com/sites/default/files/resources/FlashMAX-PCIe-SSD-DS.pdf; 2015; 2 pages.

Xinhua et al, "A Wear-Leveling Algorithm for Nandflash in Embedded System" abstract, Embedded Computing, 2008, SEC '08. Fifth IEEE Intl Symposium on, Beijing, pp. 260-265, doi 10.1109/SEC.2008.54; http://eeexplore.ieee.org/stamp/stamp.jsp?tp=&arnumber=4690759&isnumber=4690708.

Yun et al, "Dynamic Wear Leveling for Phase-Change Memories With Endurance Variations"; IEEE Transactions on Very Large Scale Integration (VLSI) Systems; vol. 23, Issue 9; Sep. 2014; pp. 1604-1615; doi 10.1109/TVLSI.2014.2350073; http://ieeexplore.ieee.org/xpl/articleDetails.jsp?arnumber=6893041.

* cited by examiner

Example: Global Mapping
with Bit Inverse of MSB 1 (0001) → 9 (1001)
2 (0010) → 10 (1010)
3 (0011) → 11 (1011)
4 (0100) → 12 (1100)
5 (0101) → 13 (1101)
6 (0110) → 14 (1110)
7 (0111) → 15 (1111)
8 (1000) → 16 (0000)
9 (1001) → 1 (0001)
10 (1010) → 2 (0010)
11 (1011) → 3 (0011)
12 (1100) → 4 (0100)
13 (1101) → 5 (0101)
14 (1110) → 6 (0110)
15 (1111) → 7 (0111)
16 (0000) → 8 (1000)

Example: Local Interleaving with Permutation
[x2 x1 x0] → [x1 x2 x0]

0 (000) → 0 (000)
1 (001) → 2 (010)
2 (010) → 1 (001)
3 (011) → 3 (011)
4 (100) → 4 (100)
5 (101) → 6 (110)
6 (110) → 5 (101)
7 (111) → 7 (111)

GENERATION OF RANDOM ADDRESS MAPPING IN NON-VOLATILE MEMORIES USING LOCAL AND GLOBAL INTERLEAVING

CROSS-REFERENCE TO RELATED APPLICATION(S)

This application claims priority to and the benefit of U.S. Provisional Application No. 62/192,509, filed on Jul. 14, 2015, and entitled, "SYSTEMS AND METHODS FOR PROVIDING DYNAMIC WEAR LEVELING IN NON-VOLATILE MEMORIES", the entire content of which is incorporated herein by reference.

FIELD

Aspects of the disclosure relate generally to mapping memory addresses, and more specifically, to generation of random address mapping in non-volatile memories using local and global interleaving.

BACKGROUND

In a variety of consumer electronics, solid state drives incorporating non-volatile memories (NVMs) are frequently replacing or supplementing conventional rotating hard disk drives for mass storage. These non-volatile memories may include one or more flash memory devices, the flash memory devices may be logically divided into blocks, and each of the blocks may be further logically divided into addressable pages. These addressable pages may be any of a variety of sizes (e.g., 512 Bytes, 1 Kilobytes, 2 Kilobytes, 4 Kilobytes), which may or may not match the logical block address sizes used by a host computing device.

During a write operation, data may be written to the individual addressable pages in a block of a flash memory device. However, in order to erase or rewrite a page, an entire block must typically be erased. Of course, different blocks in each flash memory device may be erased more or less frequently depending upon the data stored therein. Thus, since the lifetime of storage cells of a flash memory device correlates with the number of erase cycles, many solid state drives perform wear-leveling operations (both static and dynamic) in order to spread erasures more evenly over all of the blocks of a flash memory device.

To make sure that all of the physical pages in a NVM (e.g., flash memory device) are used uniformly, the usual practice is to maintain a table for the frequency of use for all of the logical pages and periodically map the most frequently accessed logical address to physical lines. However, these table indirection based methods incur significant overhead in table size. For instance to use a table approach for a 2 terabyte (TB) storage device with 512 byte pages, a 137 gigabyte (GB) table would be needed. This is clearly not practical.

SUMMARY

In one aspect, this disclosure relates to a method for generating a random address mapping for a non-volatile memory (NVM) that includes identifying a number of bits (N) in a physical address space of the NVM, selecting G bit(s) of the N bits to be used for global interleaving, where G is less than N, determining a number of bits (N−G) to be used for local interleaving, mapping the G bit(s) using a mapping function for global interleaving, interleaving (N−G) bits using an interleaving function for local interleaving, and generating a combined mapping comprising the mapped G bit(s) and the interleaved (N−G) bits.

In another aspect, this disclosure relates to an apparatus for generating a random address mapping for a non-volatile memory (NVM), the apparatus including a memory, a processor coupled to the memory and configured to identify a number of bits (N) in a physical address space of the NVM, select at least one bit (G) of the N bits of the physical address space to be used for global interleaving, where G is less than N, and determine a number of bits equal to N minus G (N−G) to be used for local interleaving. In such case, the apparatus further includes a global interleaver configured to map the at least one G bit using a mapping function for global interleaving, and a local interleaver configured to interleave (N−G) bits using a interleaving function for local interleaving, where the processor is further configured to generate a combined mapping comprising the mapped at least one G bit and the interleaved (N−G) bits.

DETAILED DESCRIPTION

Figure 1:
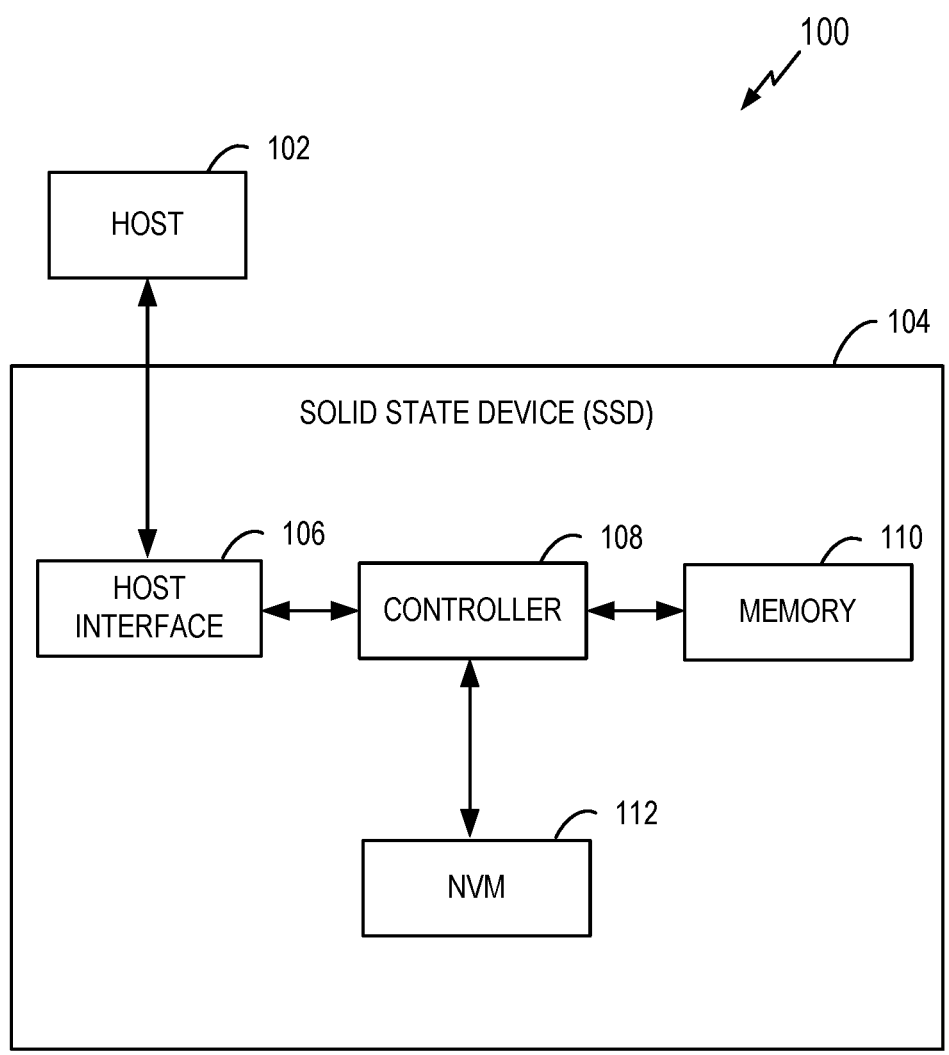
FIG. 1 is a block diagram of a solid state device (SSD) that can perform random address mapping using local and global interleaving in accordance with one embodiment of the disclosure.

Referring now to the drawings, systems and methods for generating random address mapping in non-volatile memories using local and global interleaving are illustrated. One such method involves generating a random address mapping for a non-volatile memory (NVM), and includes (1) identifying a number of bits (N) in a physical address space of the NVM, (2) selecting G bit(s) of the N bits to be used for global interleaving, where G is less than N, (3) determining a number of bits (N−G) to be used for local interleaving, (4) mapping the G bit(s) using a mapping function for global interleaving, (5) interleaving (N−G) bits using an interleaving function for local interleaving, and (6) generating a combined mapping comprising the mapped G bit(s) and the interleaved (N−G) bits. In one embodiment, the method can be used in a wear leveling scheme to randomly map a logical address space to a physical address space.

In one aspect, the system may involve an apparatus for generating a random address mapping for a non-volatile memory (NVM), the apparatus including a memory, a processor coupled to the memory and configured to (1) identify a number of bits (N) in a physical address space of the NVM, (2) select at least one bit (G) of the N bits of the physical address space to be used for global interleaving, where G is less than N, and (3) determine a number of bits equal to N minus G (N−G) to be used for local interleaving. In such case, the apparatus may further include a global interleaver configured to map the at least one G bit using a mapping function for global interleaving, and a local interleaver configured to interleave (N−G) bits using a interleaving function for local interleaving, where the processor is further configured to generate a combined mapping comprising the mapped at least one G bit and the interleaved (N−G) bits.

FIG. 1 is a block diagram of a solid state device (SSD) that can perform random address mapping using local and global interleaving in accordance with one embodiment of the disclosure. The system 100 includes a host 102 and a SSD storage device 104 coupled to the host 102. The host 102 provides commands to the SSD storage device 104 for transferring data between the host 102 and the SSD storage device 104. For example, the host 102 may provide a write command to the SSD storage device 104 for writing data to the SSD storage device 104 or read command to the SSD storage device 104 for reading data from the SSD storage device 104. The host 102 may be any system or device having a need for data storage or retrieval and a compatible interface for communicating with the SSD storage device 104. For example, the host 102 may a computing device, a personal computer, a portable computer, or workstation, a server, a personal digital assistant, a digital camera, a digital phone, or the like.

The SSD storage device 104 includes a host interface 106, a controller 108, a memory 110, and a non-volatile memory 112. The host interface 106 is coupled to the controller 108 and facilitates communication between the host 102 and the controller 108. Additionally, the controller 108 is coupled to the memory 110 and the non-volatile memory 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, or the like. In some embodiments, the host 102 includes the SSD storage device 104. In other embodiments, the SSD storage device 104 is remote with respect to the host 102 or is contained in a remote computing system coupled in communication with the host 102. For example, the host 102 may communicate with the SSD storage device 104 through a wireless communication link.

The controller 108 controls operation of the SSD storage device 104. In various embodiments, the controller 108 receives commands from the host 102 through the host interface 106 and performs the commands to transfer data between the host 102 and the non-volatile memory 112. The controller 108 may include any type of processing device, such as a microprocessor, a microcontroller, an embedded controller, a logic circuit, software, firmware, or the like, for controlling operation of the SSD storage device 104.

In some embodiments, some or all of the functions described herein as being performed by the controller 108 may instead be performed by another element of the SSD storage device 104. For example, the SSD storage device 104 may include a microprocessor, a microcontroller, an embedded controller, a logic circuit, software, firmware, or any kind of processing device, for performing one or more of the functions described herein as being performed by the controller 108. In some embodiments, one or more of the functions described herein as being performed by the controller 108 are instead performed by the host 102. In some embodiments, some or all of the functions described herein as being performed by the controller 108 may instead be performed by another element such as a controller in a hybrid drive including both non-volatile memory elements and magnetic storage elements.

The memory 110 may be any memory, computing device, or system capable of storing data. For example, the memory 110 may be a random-access memory (RAM), a dynamic random-access memory (DRAM), a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the memory 110, or a portion thereof, to store data during the transfer of data between the host 102 and the non-volatile memory 112. For example, the memory 110 or a portion of the memory 110 may be a cache memory.

The non-volatile memory (NVM) 112 receives data from the controller 108 and stores the data. The non-volatile memory 112 may be any type of non-volatile memory, such as a flash storage system, a solid state drive, a flash memory card, a secure digital (SD) card, a universal serial bus (USB) memory device, a CompactFlash card, a SmartMedia device, a flash storage array, or the like.

The controller 108 or NVM 112 can be configured to perform any of the random address mapping schemes using local and global interleaving described herein.

As discussed in the background section above, for page based NVM, one can maintain a table for frequency of use and an indirection table for all the logical pages and periodically map the most frequently accessed logical address to physical lines.

Figure 2:
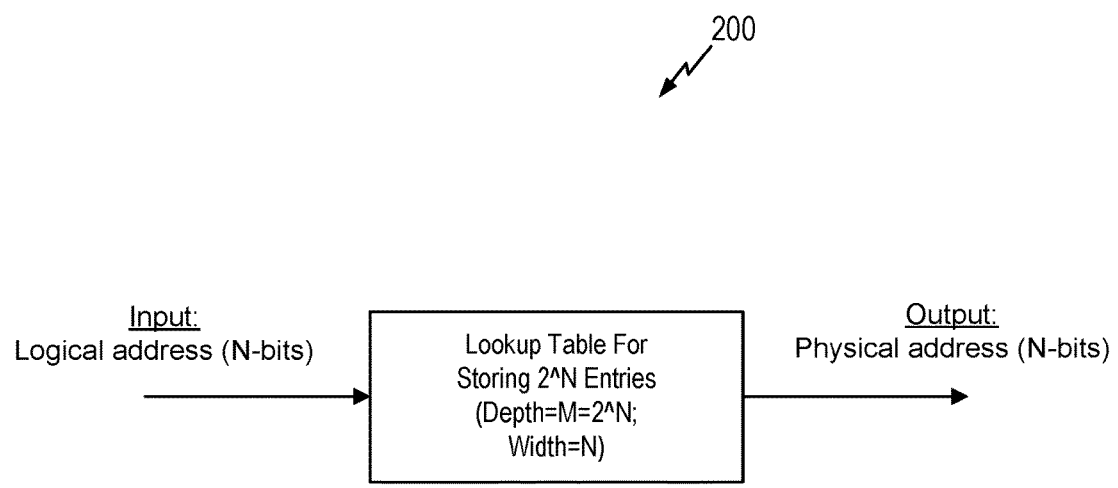
FIG. 2 is a block diagram of indirection table in accordance with one embodiment of the disclosure.

FIG. 2 is a block diagram of indirection table 200 in accordance with one embodiment of the disclosure. For example, in a drive with M pages/sectors, the indirection table has M entries as is depicted in FIG. 2. In such case, each entry is N bits where N is log 2(M). For a 2 TB drive with 512 byte pages, $M=2\times10^{12}B/512B=3.9\times10^9$ and thus N is equal to 32. As such, the memory required in bits for the table would be M×log 2M=125 GB (~15 GB). The frequency of use table would also consume similar space (~15 GB). So the total requirement would be around 30 GB for this meta data. In some implementations, the meta data may have to be replicated with two plus one redundancy, thereby increasing the complexity up to 90 GB. In such case, this memory usage amounts to around 4.5% of disk space. So this sort of approach would not be practical.

Figure 3:
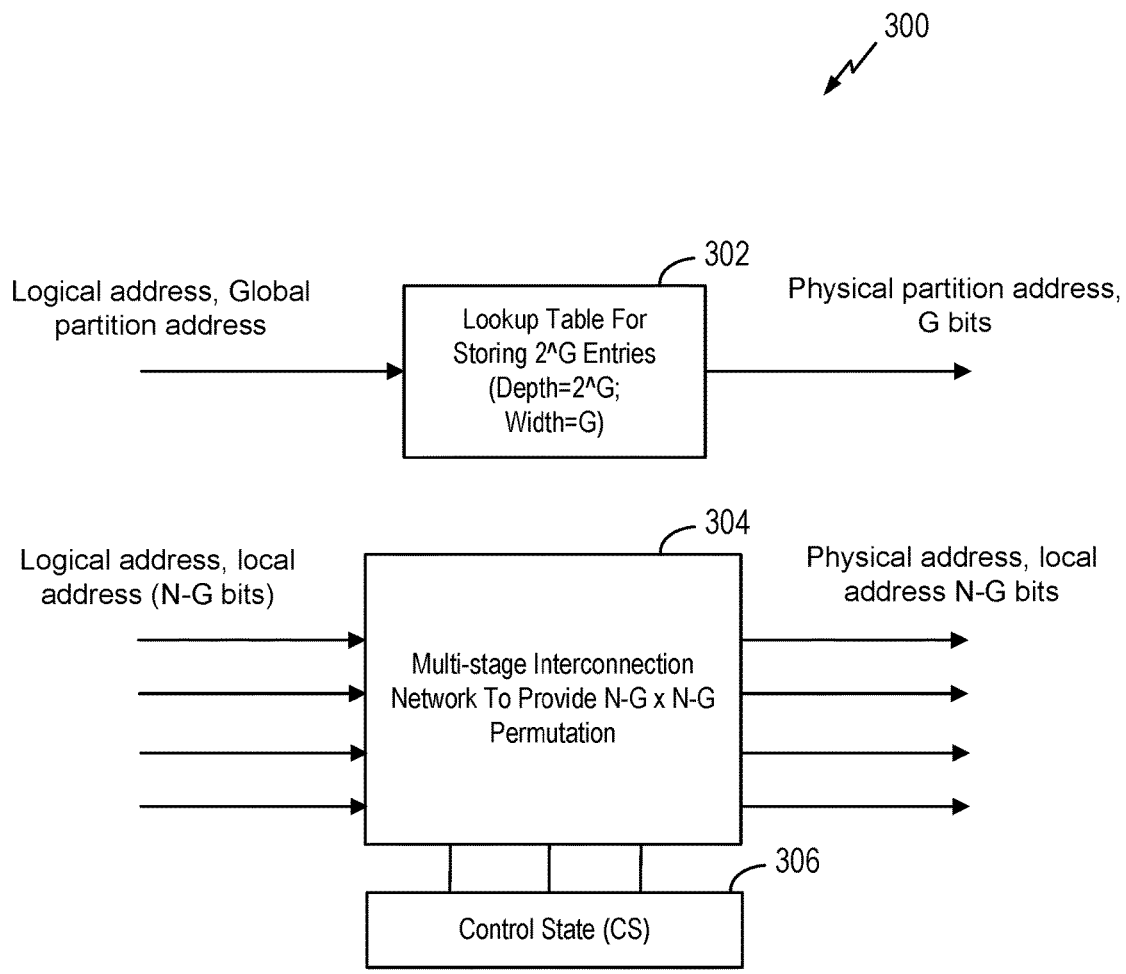
FIG. 3 is a block diagram of a general system for random address mapping using local and global interleaving in accordance with one embodiment of the disclosure.

FIG. 3 is a block diagram of a general system for random address mapping using local and global interleaving in accordance with one embodiment of the disclosure. The system 300 includes a lookup table 302 that can be used to store 2^G entries with a depth of 2^G and a width of G. The system 300 also includes a multi-stage interconnection network (MIN) 304 that can be used to provide permutations of data sets, and a control state block 306 that can be used to control the MIN 304. The system 300 illustrates a general framework for mapping an N-bit logical address space to N-bit physical space by first dividing the address bits into G bits and N-G bits. In general, any G bits out of the N bits can be selected using another fixed network. In this context, a fixed network can simply be a fixed arrangement of wires to arrive at a specific network. As compared to a multi-stage programmable interconnection network, the fixed network may not have programmability. For simplicity, the G bits selected are the most significant bits (MSBs) of the N bits. So the system can perform mapping on 2^G entries in block 302, and perform bit permutation on N-G bits in block 304. The G bits can be mapped using a 2^G entry mapping table 302. In one aspect, the mapping can be performed such that there is one-to-one unique mapping and the input is not equal to the output. Also, in one aspect, G is selected such that 1<=G<=N. In one aspect, the case of G<=6 may be of particular interest. If G=N, then this case can be equivalent to the conventional mapping table approach.

In one embodiment, the global mapping can satisfy one or more properties. For example, in one aspect, the global mapping can be a one to one function. In another aspect, the global mapping can be performed such that the input is not equal to the output. In another aspect, a swap can be performed such that a global mapping of a number (k) is equal to kk, while a global mapping of kk is equal to k. So suitable functions for global mapping may include bit inverse mapping, random swap, deterministic swap, and other suitable functions. Bit inverse mapping can be chosen for a simple hardware implementation. If a table is used, the maximum size of the table needed can be 2^G entries with each entry having a width of G bits. Since G is not more than 7 in this example, the table approach is also suitable.

In one embodiment, the local mapping can satisfy one or more properties. For example, in one aspect, the local mapping can be a one to one function. So suitable functions for local mapping may include deterministic mapping and/or random mapping. In one aspect, random mapping may be selected. Deterministic or random mapping may be implemented using tables or an Omega network, a Butterfly network, a Benes network, or another suitable network. In one aspect, a Benes network (e.g., such as a master-slave Benes network) is selected as it has the lowest complexity for computing the switch state required. In this network, a bitonic sorting can be implemented on master Benes network on sequences with certain properties to derive the switch state for slave Benes network.

In one embodiment, a wear leveling algorithm implemented with the random address mapping can involve operating in an address space, set partitioning the address space, and local and global interleaving in the address space. In one aspect, the wear leveling algorithm can involve gradual deterministic transition from one memory map to another memory map.

Figure 4:
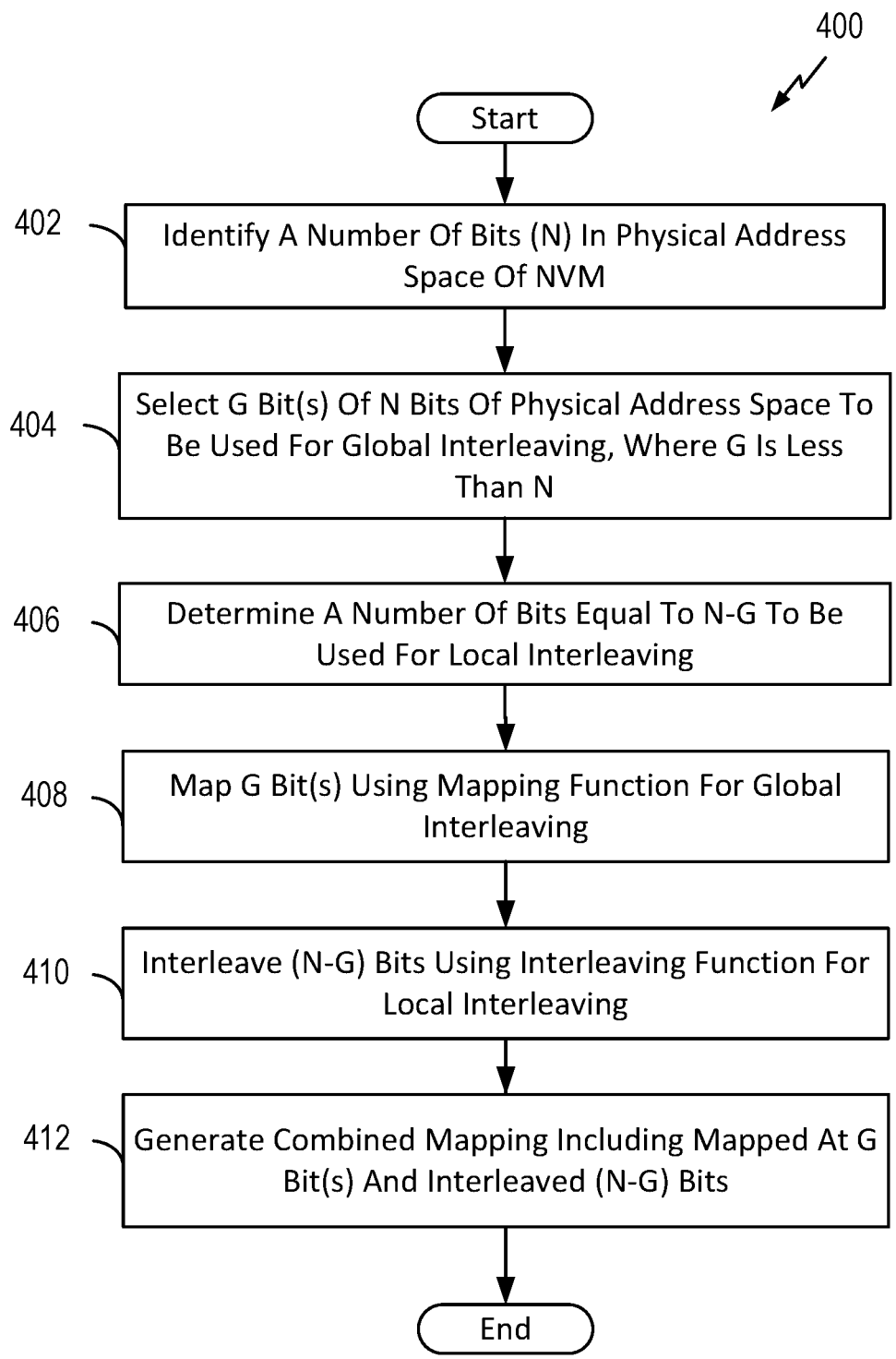
FIG. 4 is a flow chart of a process for random address mapping using global mapping and local interleaving in accordance with one embodiment of the disclosure.

FIG. 4 is a flow chart of a process for random address mapping using global mapping and local interleaving in accordance with one embodiment of the disclosure. In one embodiment, the process can be used for wear leveling or other random address mapping in any of the random mapping systems described herein. In block 402, the process identifies a number of bits (N) in a physical address space of a non-volatile memory (NVM). In block 404, the process selects at least one bit (G) of the N bits of the physical address space to be used for global interleaving, where G is less than N. In block 406, the process determines a number of bits equal to N minus G (N-G) to be used for local interleaving.

In block 408, the process maps the G bit(s) using a mapping function for global interleaving. In one embodiment, the mapping function can be a bit inverse mapping function, a random swap mapping function, a deterministic swap mapping function, and/or another suitable mapping function.

In block 410, the process interleaves (N-G) bits using an interleaving function for local interleaving. In one embodiment, the interleaving function can be a deterministic interleaving function, a random interleaving function, and/or another suitable interleaving function. In one embodiment, the interleaving function can be implemented using an Omega network, a Butterfly network, a Benes network, a master-slave Benes network, and/or another suitable interleaving function.

In some embodiments, the mapping function for the global interleaving is a bit inverse mapping function, and the interleaving function is implemented using a master-slave Benes network. In one such embodiment, the G bit(s) are the most significant bit(s) of the physical address space of the NVM, and the bit inverse mapping function involves inversing each of the G bit(s).

In block 412, the process generates a combined mapping including the mapped G bit(s) and the interleaved (N-G) bits. In one embodiment, the combined mapping constitutes a mapped physical address (see for example col. 806 in FIG. 8 as will be discussed in more detail below).

Figure 5:
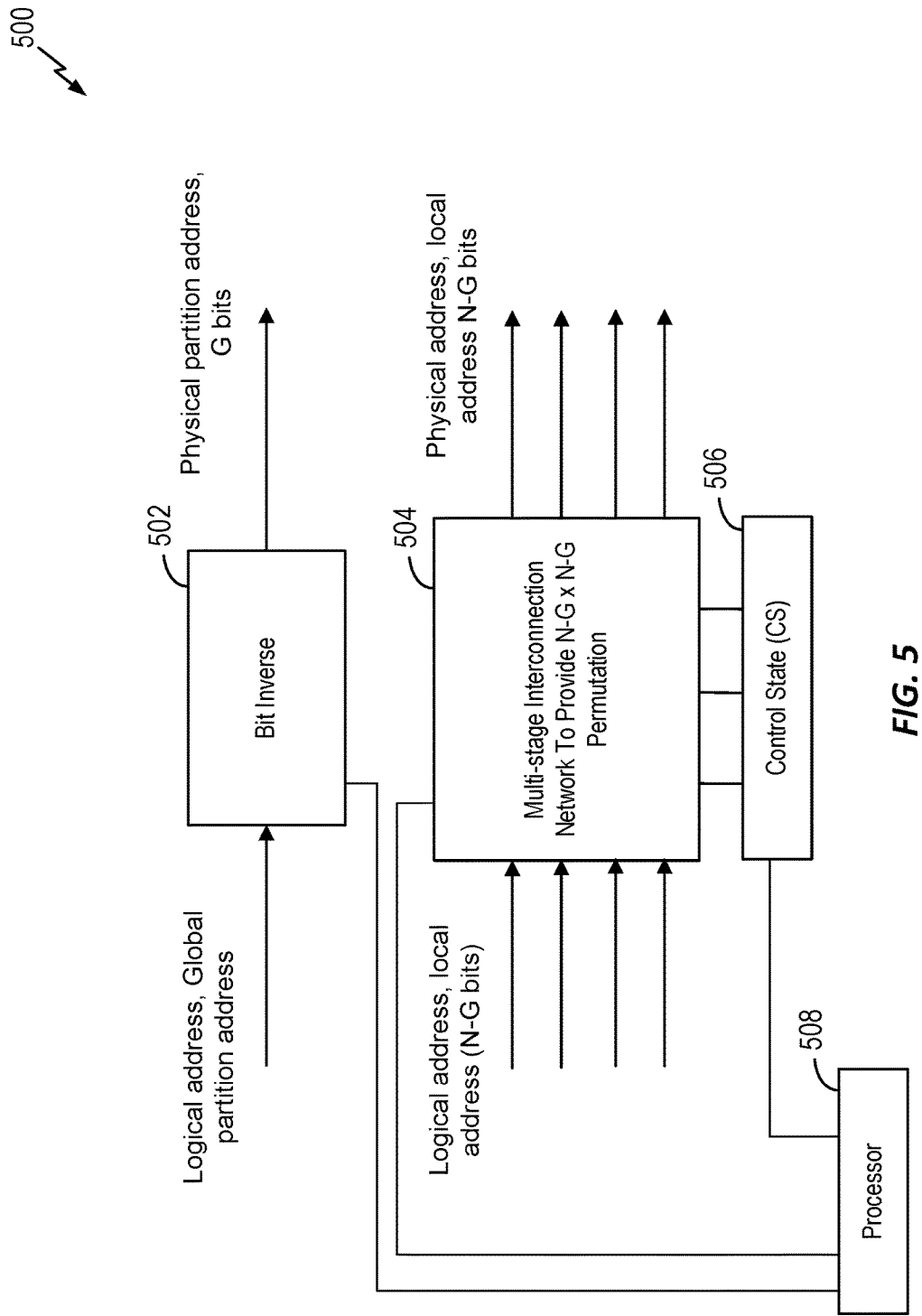
FIG. 5 is a block diagram of a system for performing random address mapping with bit inverse for global mapping (G bits) and permutation for local interleaving (N-G bits) in accordance with one embodiment of the disclosure.

FIG. 5 is a block diagram of a system for performing random address mapping with bit inverse for global mapping (G bits) and permutation for local interleaving (N-G bits) in accordance with one embodiment of the disclosure. The system 500 includes a bit inverse block 502 that can be used to inverse selected bits of the logical address. In one aspect, for example, the bit inverse block 502 can be used to map G bits using a mapping function for global interleaving as is described in block 408 of FIG. 4, where the mapping function is a bit inversing function. The system 500 also includes a multi-stage interconnection network (MIN) 504 that can be used to provide permutations of data sets, such as permutations of selected bits of the logical address. In one aspect, the MIN 504 can be used to interleave N-G bits using an interleaving function for local interleaving as is described in block 410 of FIG. 4. The system 500 also includes a control state block 506 that can be used to control the MIN 504.

The system 500 further includes a processor 508 which can be used to control and/or perform computations for the bit inverse block 502 and the MIN 504. In this context, processor 508 refers to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, and other suitable circuitry. Further, it should be appreciated that the term processor, microprocessor, circuitry, controller, and other such terms, refer to any type of logic or circuitry capable of executing logic, commands, instructions, software, firmware, functionality, or other such information. In one aspect, the processor 508 can be used to identify a number of bits (N) in a physical address space of a non-volatile memory (NVM) as is described in block 402 of FIG. 4, select at least one bit (G) of the N bits of the physical address space to be used for global interleaving, where G is less than N as is described in block 404 of FIG. 4, and/or determine a number of bits equal to N minus G (N−G) to be used for local interleaving as is described in block 406 of FIG. 4. In one aspect, the processor 508 can also be used to generate a combined mapping including the mapped G bit(s) and the interleaved (N−G) bits as is described in block 412 of FIG. 4. In one embodiment, the combined mapping is instead generated by block 502 and/or block 506.

In one simple example to illustrate the address space operations, and as depicted in FIG. 5, assume the number of pages (M) in the NVM is 16 (i.e., M=16 pages). In such case, the number of address bits (N) can be computed as N=log 2(M)=4 address bits. In such case, the parameters of the configuration would be as follows: G=1 (2^G partitions), L=N−G=4−1=3 (3×3 network). This simple example will be carried through FIGS. 6 to 8.

Figure 6:
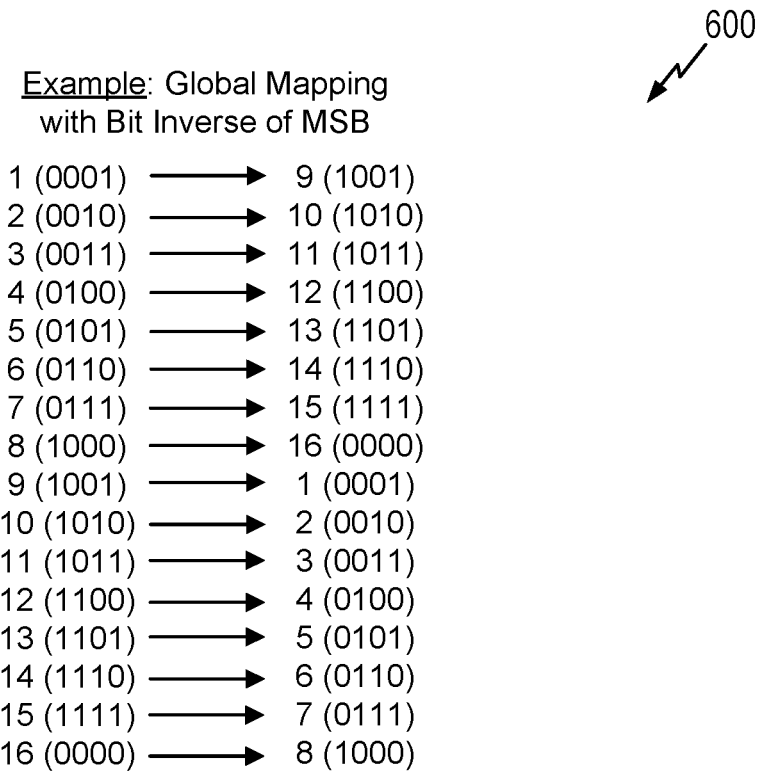
FIG. 6 is a table illustrating a numerical example of global mapping using bit inverse on G bits in accordance with one embodiment of the disclosure.

FIG. 6 is a table 600 illustrating an example of global mapping using bit inverse on G bits in accordance with one embodiment of the disclosure. In one aspect, the table 600 of FIG. 6 can be viewed as an example of the global mapping shown in block 502 of FIG. 5. In the continuing simple example, G is 1 bit (i.e., the most significant bit (MSB) of the 4 address bits). In the example of FIG. 6, the table 600 illustrates the initial addresses in the left column, shown in both decimal and binary. The table 600 also illustrates the final addresses, after global mapping using bit inverse on the G bits (i.e., the MSB), in the right column of addresses, shown in both decimal and binary. As can be seen in FIG. 6, the global mapping using bit inverse is a one to one function, and the input is not equal to the output. This implementation is consistent with one or more of the possible design characteristics discussed above.

Figure 7:
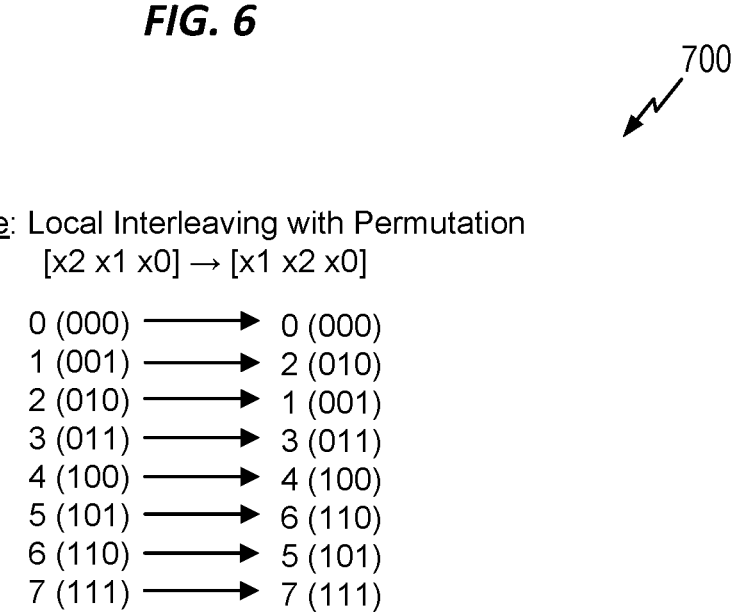
FIG. 7 is a table illustrating a numerical example of local interleaving using a permutation on N-G bits in accordance with one embodiment of the disclosure.

FIG. 7 is a table 700 illustrating an example of local interleaving using a permutation on N-G bits in accordance with one embodiment of the disclosure. More specifically, for the local interleaving of address bits, assume the 3 address bits ([x2 x1 x0]) are permuted to [x1 x2 x0]. In the example of FIG. 7, the table 700 illustrates the initial addresses in the left column, shown in both decimal and binary. The table 700 also illustrates the final addresses, after local mapping using the selected permutation, in the right column of addresses, shown in both decimal and binary. As can be seen in FIG. 7, the local interleaving using permutation is a one to one function. This implementation is consistent with one or more of the possible design characteristics discussed above. In one aspect, the table 700 of FIG. 7 can be viewed as an example of the local interleaving as shown in block 504 of FIG. 5.

Figure 8:
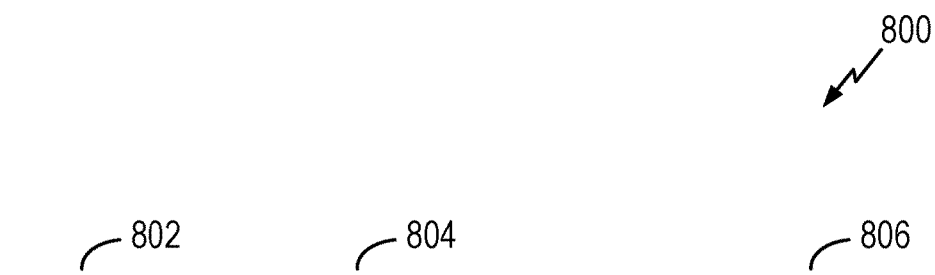
FIG. 8 is a table illustrating a numerical example of global mapping using bit inverse and local interleaving using permutation in accordance with one embodiment of the disclosure.

FIG. 8 is a table 800 illustrating an example of global mapping using bit inverse and local interleaving using permutation in accordance with one embodiment of the disclosure. The left most column 802 shows the original addresses in decimal. The middle column 804 shows the effect of global mapping/interleaving only and matches the final column (e.g., results) of FIG. 6. The right most column 806 shows the resulting physical addresses with both the global mapping using bit inverse and the local interleaving using a selected permutation. This simple example illustrates one possible operation of the systems and methods of FIGS. 3-5. More specifically, the table 800 of FIG. 8 can be viewed as an example of the combined mapping that can be generated by any combination of the processor 508, block 502 and 504 of FIG. 5.

Figure 9:
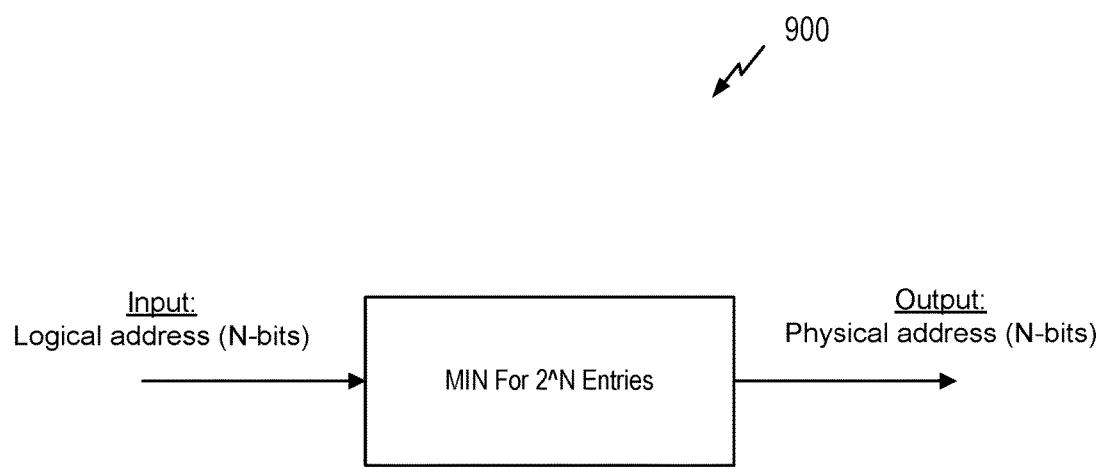
FIG. 9 is a block diagram of a multi-stage interconnection network (MIN) that can be used to perform local interleaving in accordance with one embodiment of the disclosure.

FIG. 9 is a block diagram of a multi-stage interconnection network (MIN) 900 that can be used to perform local interleaving (e.g., block 504 in FIG. 5) in accordance with one embodiment of the disclosure. This MIN approach (e.g., multi-stage interconnection network or MIN with 2^N entries) for generating random mapping from logical space and physical space is may be expensive to implement as the storage size can be large.

More specifically, in one aspect, moving items has to be done based on a certain order defined by mapping. For a read process, to differentiate which chip select (CS) has to be used, another table of 2^N entries and each entry width needs to be maintained. In contrast, the CS chip storage is equal to log 2(N)*N/2 for an Omega network and log 2(N)*N for a Benes network.

Figure 10:
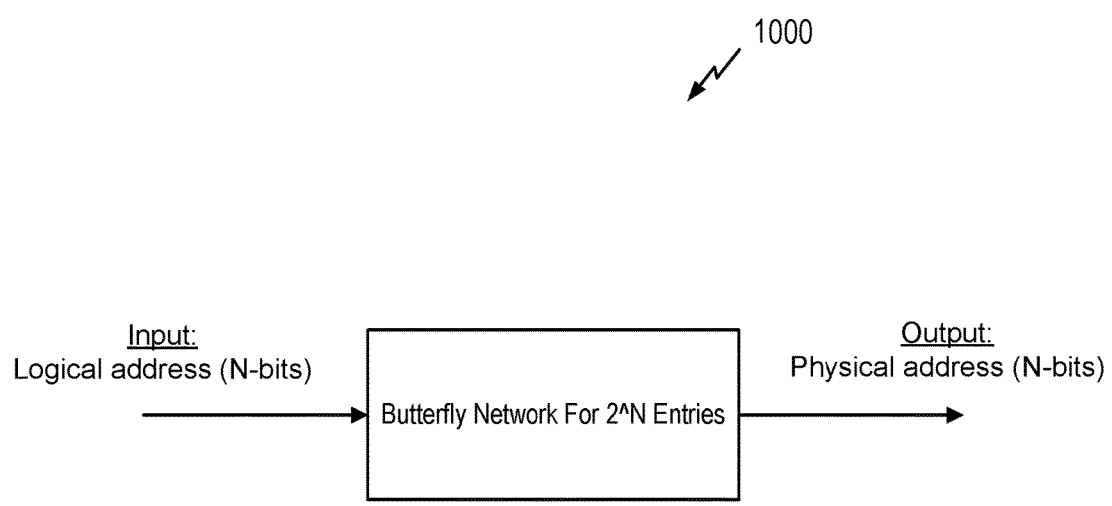
FIG. 10 is a block diagram of a butterfly MIN that can be used to perform local interleaving in accordance with one embodiment of the disclosure.

FIG. 10 is a block diagram of a butterfly MIN 1000 that can be used to perform local interleaving in accordance with one embodiment of the disclosure. This MIN approach (e.g., butterfly MIN on 2^N entries) for generating random mapping from logical space and physical space is a suitable multi-stage interconnection network that may be used, for example, for the MIN 504 of FIG. 5 or the MIN 304 of FIG. 3.

For the trivial case of shuffle equal to 1 for the physical address space, the network is not needed as it is easy to figure out the mapping. In this context, an address shuffle can be defined as a left cyclic shift of the physical address, which is a binary string. Consider for example stages 1 to M. At stage k, the physical address of a logical address is given by (xn-1, xn-2, xn-3, xn-k, . . . , x1, x0) is converted to (via inverse) (Xn-1, Xn-2, Xn-3, Xn-k-1, . . . , x1, x0). In one aspect, another simpler case may include a butterfly permutation where the MSB is swapped with the LSB, a substitution permutation where any ith bit is swapped with bit 0 (e.g., the LSB), and a super permutation where any ith bit is swapped with the MSB. In another aspect, the local interleaving may involve using any switch combination for each stage.

In general a MIN may be used is one of two modes. For example, in a routing mode, the switches in MIN are configured to realize the desired mapping from input ports to output ports in one or more passes. In such case, each input port takes a multi-bit (say m-bit) word and each output port gives a m-bit word, and there are N inputs and N outputs. In a second mode, an interleaving mode, the switches in MIN are configured using a random seed. This results in a random mapping from input ports to output ports in a single pass. In several aspects, the interleavers and/or interleaving described herein can use a MIN in the interleaving mode to interleave preselected bits in a desired manner.

Figure 11:
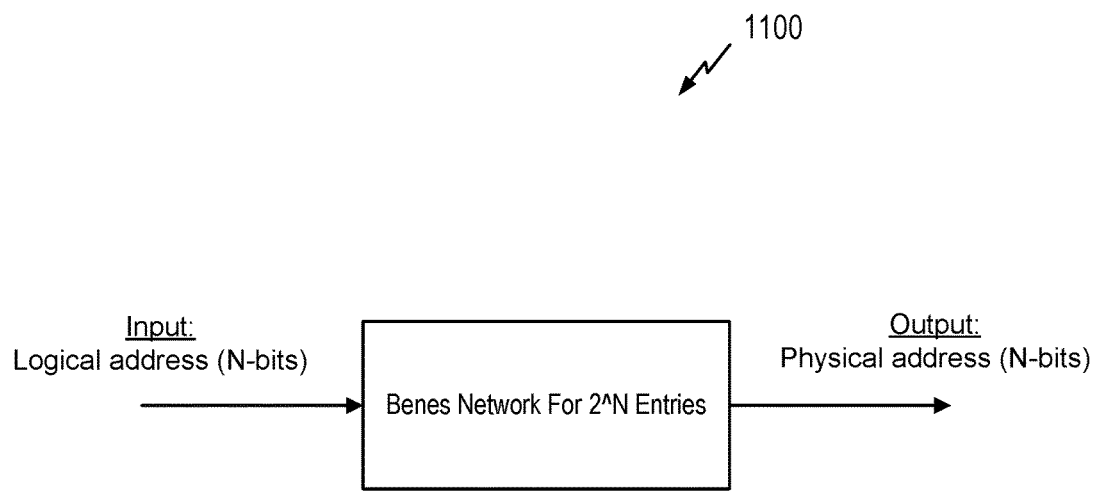
FIG. 11 is a block diagram of a Benes MIN that can be used to perform local interleaving in accordance with one embodiment of the disclosure.

FIG. 11 is a block diagram of a Benes MIN 1100 that can be used to perform local interleaving in accordance with one embodiment of the disclosure. This MIN approach (e.g., Benes MIN on 2^N entries) for generating random mapping from logical space and physical space is a suitable multi-stage interconnection network that may be used, for example, for the MIN 504 of FIG. 5 or the MIN 304 of FIG. 3.

Figure 12:
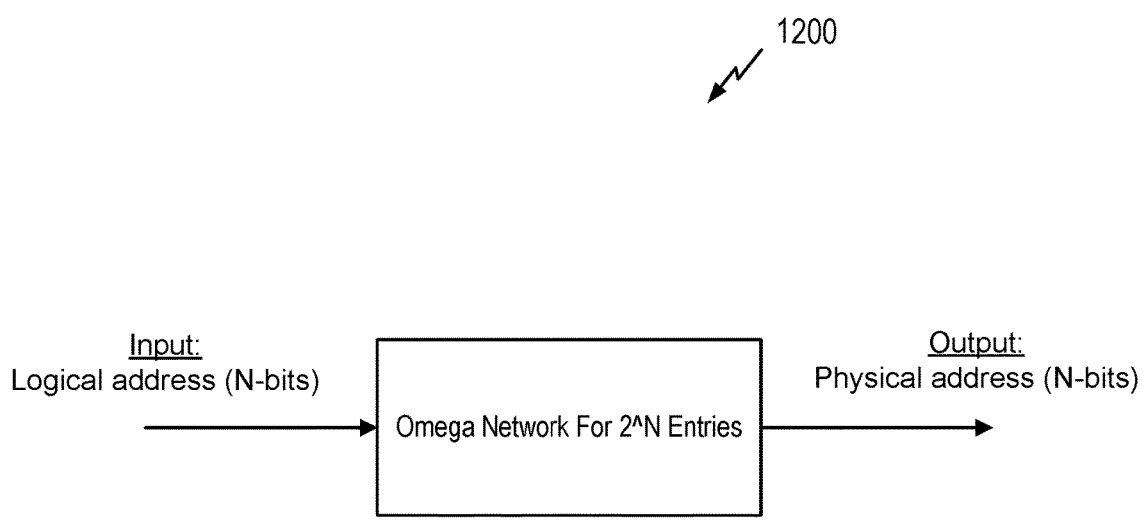
FIG. 12 is a block diagram of a Omega MIN that can be used to perform local interleaving in accordance with one embodiment of the disclosure.

FIG. 12 is a block diagram of a Omega MIN that can be used to perform local interleaving in accordance with one embodiment of the disclosure. This MIN approach (e.g., Omega MIN on 2^N entries) for generating random mapping from logical space and physical space is a suitable multistage interconnection network that may be used, for example, for the MIN 504 of FIG. 5 or the MIN 304 of FIG. 3. In one aspect, the Omega network may only be able to provide a subset of all possible permutations of switching while the Benes network may be able provide all possible permutations. In one aspect, if a desired permutation is required, it may be difficult to solve chip select settings for the Benes network. To counter this potential issue, one implementation of the Benes network involves randomly setting the chip select settings, which can makes the chip select algorithm much simpler. That is, the randomly generated chip select settings reduce computing time requirements and/or computing challenges needed to solve the chip select settings.

Figure 13:
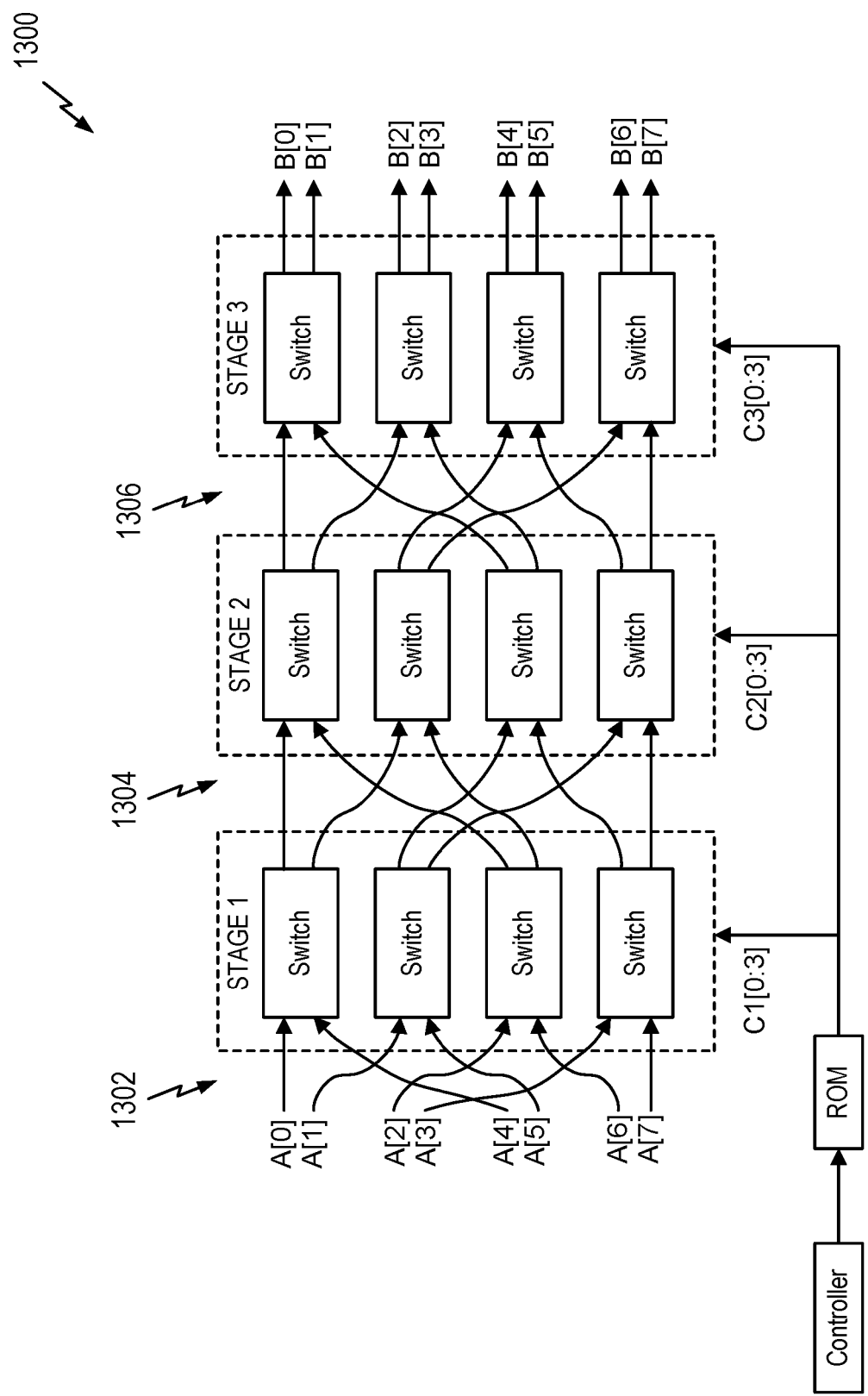
FIG. 13 shows a block diagram of a modified Omega MIN that can be used to perform local interleaving in accordance with one embodiment of the disclosure.

FIG. 13 shows a block diagram of a modified (8×8) Omega MIN 1300 that can be used to perform local interleaving in accordance with one embodiment of the disclosure. In general, Omega networks are (N×N) multistage interconnection networks that are sized according to integer powers of two. Thus, Omega networks have sizes of N=2, 4, 8, 16, 32, 64, 128, etc. Further, the number L of stages in an Omega network is equal to log 2(N) and the number of (2×2) switches per stage is equal to N/2.

Omega network 1300 is an (8×8) network that receives eight input values at eight input terminals A[0:7] and maps the eight input values to eight output terminals B[0:7]. Each input value may be any suitable value such as a single bit, a plurality of bits, a sample, or a soft value (such as a Viterbi log-likelihood ratio (LLR) value) having a hard-decision bit and at least one confidence-value bit. The eight input values are mapped to the eight output terminals using log 2(8)=3 configurable stages i, where i=1, 2, 3, each of which comprises 8/2=4 (2×2) switches.

Each stage i receives the eight input values from the previous stage, or from input terminals A[0:7] in the case of stage 1, via a fixed interconnection system (e.g., 1302, 1304, and 1306) that implements a perfect shuffle on the eight input values. A perfect shuffle is a process equivalent to (i) dividing a deck of cards into two equal piles, and (ii) shuffling the two equal piles together in alternating fashion such that the cards in the first pile alternate with the cards from the second pile.

For example, stage 1 receives eight inputs values from input terminals A[0:7] via fixed interconnection system 1302. Fixed interconnection system 1302 performs a perfect shuffle on the eight input values by dividing the eight input values received at input terminals A[0:7] into a first set corresponding to input terminals A[0:3] and a second set corresponding to input terminals A[4:7]. Similarly, fixed interconnection system 1304 performs a perfect shuffle on the outputs of switches from stage 1 and provides the shuffled outputs to the switches of stage 2, and fixed interconnection system 1306 performs a perfect shuffle on the outputs of the switches of stage 2 and provides the shuffled outputs to the switches of stage 3.

In addition to receiving eight input values, each configurable stage i receives a four-bit control signal Ci[0:3] from control signal memory (e.g., ROM), wherein each bit of the four-bit control signal configures a different one of the four 2×2 switches in the stage. Thus, the switches of stage 1 are configured based on the values of control bits C1[0], C1[1], C1[2], and C1[3], the switches of stage 2 are configured based on the values of control bits C2[0], C2[1], C2[2], and C2[3], and the switches of stage 3 are configured based on the values of control bits C3[0], C3[1], C3[2], and C3[3].

Setting a control bit to a value of one configures the corresponding switch as a crossed connection such that (i) the value received at the upper input is provided to the lower output and (ii) the value received at the lower input is provided to the upper output. Setting a control bit to a value of zero configures the corresponding switch as a straight pass-through connection such that (i) the value received at the upper input is provided to the upper output and (ii) the value received at the lower input is provided to the lower output.

In signal-processing applications, multistage interconnection networks, such as Omega network 1300, are often used for routing purposes to connect processors on one end of the network to memory elements on the other end. However, multistage interconnection networks may also be used in signal-processing applications for other purposes, such as for permutating or interleaving a contiguous data stream.

FIG. 13 illustrates one implementation of a suitable Omega MIN configured for interleaving. In other embodiments, other implementations of a suitable Omega MIN can be used.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method of generating a random address mapping for a non-volatile memory (NVM), comprising:
   identifying a number of bits (N) in a physical address space of the NVM;
   selecting at least one bit (G) of the N bits of the physical address space to be used for global interleaving, where G is less than N;
   determining a number of bits equal to N minus G (N−G) to be used for local interleaving;
   mapping the at least one G bit using a mapping function for global interleaving;
   interleaving (N−G) bits using an interleaving function for local interleaving; and
   generating a combined mapping comprising the mapped at least one G bit and the interleaved (N−G) bits.

2. The method of claim 1, wherein the mapping function for the global interleaving is selected from the group consisting of a bit inverse mapping function, a random swap mapping function, and a deterministic swap mapping function.

3. The method of claim 1, wherein the interleaving function for the local interleaving is selected from the group consisting of a deterministic interleaving function and a random interleaving function.

4. The method of claim 1, wherein the interleaving function is implemented using a multi-stage connection network.

5. The method of claim 1, wherein the interleaving function is implemented using a network selected from the group consisting of an Omega network, a Butterfly network, a Benes network, and combinations thereof.

6. The method of claim 5, wherein the network comprises a plurality of control inputs, the method further comprising providing a plurality of random values to the plurality of control inputs.

7. The method of claim 1:
wherein the mapping function for the global interleaving is a bit inverse mapping function; and
wherein the interleaving function is implemented using a Benes network.

8. The method of claim 7:
wherein the at least one G bit comprises the most significant bit of the physical address space of the NVM; and
wherein the bit inverse mapping function comprises inversing each of the at least one G bit.

9. The method of claim 1, further comprising:
mapping at least one address in the physical address space of the NVM to a logical memory address for the NVM using the combined mapping.

10. The method of claim 1, wherein the combined mapping constitutes a mapped physical memory address.

11. The method of claim 1, wherein the mapping the at least one G bit using the mapping function for global interleaving comprises mapping the at least one G bit from a logical memory address using the mapping function for global interleaving.

12. The method of claim 11, wherein the interleaving (N−G) bits using the interleaving function for local interleaving comprises interleaving (N−G) bits from the logical memory address using the interleaving function for local interleaving.

13. The method of claim 12, wherein the combined mapping constitutes a mapped physical memory address.

14. An apparatus for generating a random address mapping for a non-volatile memory (NVM), comprising:
a memory;
a processor coupled to the memory and configured to:
identify a number of bits (N) in a physical address space of the NVM;
select at least one bit (G) of the N bits of the physical address space to be used for global interleaving, where G is less than N; and
determine a number of bits equal to N minus G (N−G) to be used for local interleaving;
a global interleaver configured to map the at least one G bit using a mapping function for global interleaving; and
a local interleaver configured to interleave (N−G) bits using a interleaving function for local interleaving,
wherein the processor is further configured to generate a combined mapping comprising the mapped at least one G bit and the interleaved (N−G) bits.

15. The apparatus of claim 14, wherein the mapping function for the global interleaving is selected from the group consisting of a bit inverse mapping function, a random swap mapping function, and a deterministic swap mapping function.

16. The apparatus of claim 14, wherein the interleaving function for the local interleaving is selected from the group consisting of a deterministic interleaving function and a random interleaving function.

17. The apparatus of claim 14, wherein the interleaving function is implemented using a multi-stage connection network.

18. The apparatus of claim 14, wherein the interleaving function is implemented using a network selected from the group consisting of an Omega network, a Butterfly network, a Benes network, and combinations thereof.

19. The apparatus of claim 18:
wherein the network comprises a plurality of control inputs, and
wherein the processor is further configured to provide a plurality of random values to the plurality of control inputs.

20. The apparatus of claim 14:
wherein the mapping function for the global interleaving is a bit inverse mapping function; and
wherein the interleaving function is implemented using a Benes network.

21. The apparatus of claim 20:
wherein the at least one G bit comprises the most significant bit of the physical address space of the NVM; and
wherein the bit inverse mapping function comprises inversing each of the at least one G bit.

22. The apparatus of claim 14:
wherein the processor is further configured to map at least one address in the physical address space of the NVM to a logical memory address for the NVM using the combined mapping.

23. The apparatus of claim 14, wherein the combined mapping constitutes a mapped physical memory address.

24. The apparatus of claim 14, wherein the processor is further configured to map the at least one G bit from a logical memory address using the mapping function for global interleaving.

25. The apparatus of claim 24, wherein the processor is further configured to interleave (N−G) bits from the logical memory address using the interleaving function for local interleaving.

26. The apparatus of claim 25, wherein the combined mapping constitutes a mapped physical memory address.

* * * * *